United States Patent
Jefferies et al.

(10) Patent No.: US 11,646,681 B2
(45) Date of Patent: *May 9, 2023

(54) MOTOR BRANCH CIRCUIT HEALTH MONITORING METHOD

(71) Applicant: Schneider Electric USA, Inc., Andover, MA (US)

(72) Inventors: Kevin M. Jefferies, Raleigh, NC (US); Benjamin W. Edwards, Rolesville, NC (US); Alan E. Freeman, Raleigh, NC (US); Richard K Weiler, Wake Forest, NC (US); Matthew L. White, Cary, NC (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/892,432

(22) Filed: Aug. 22, 2022

(65) Prior Publication Data

US 2022/0399837 A1 Dec. 15, 2022

Related U.S. Application Data

(63) Continuation of application No. 16/446,050, filed on Jun. 19, 2019, now Pat. No. 11,451,171.

(51) Int. Cl.
*H02P 1/26* (2006.01)
(52) U.S. Cl.
CPC ..................... *H02P 1/26* (2013.01)
(58) Field of Classification Search
CPC ........................................................ H02P 1/26

USPC .......................................................... 318/778
See application file for complete search history.

(56) References Cited

U.S. PATENT DOCUMENTS

| | | |
|---|---|---|
| 3,895,275 A | 7/1975 | Rostad |
| 4,065,804 A | 12/1977 | Rostad |
| 4,779,034 A | 10/1988 | Shepard, Jr. |
| 2003/0052643 A1 | 3/2003 | Sweo |
| 2008/0082216 A1 | 4/2008 | Siciliano et al. |
| 2010/0231150 A1 | 9/2010 | Tan et al. |
| 2012/0038300 A1 | 2/2012 | Kato et al. |

(Continued)

FOREIGN PATENT DOCUMENTS

| | | |
|---|---|---|
| CN | 103329381 A | 9/2013 |
| CN | 103823181 A | 5/2014 |
| CN | 108347038 A | 7/2018 |

OTHER PUBLICATIONS

Definitions of Voltage Unbalance; IEEE Power Engineering Review, vol. 21, Issue 5; May 2001.

(Continued)

*Primary Examiner* — Kawing Chan
(74) *Attorney, Agent, or Firm* — Locke Lord LLP

(57) ABSTRACT

Techniques for monitoring the health of a three-phase induction motor are provided. An expected threshold value is calculated as a function of an expected ratio of current unbalance to voltage unbalance for the three-phase motor. Embodiments determine whether a measured current unbalance exceeds the expected threshold value. Responsive to the measured current unbalance exceeding the expected threshold value, a remedial action may be taken, such as generating diagnostic information or activating one or more protection operations for the three-phase induction motor.

17 Claims, 4 Drawing Sheets

(56) References Cited

U.S. PATENT DOCUMENTS

| | | | |
|---|---|---|---|
| 2012/0262103 A1 | 10/2012 | Ek et al. | |
| 2013/0127390 A1 | 5/2013 | DaCunha et al. | |
| 2013/0241463 A1 | 9/2013 | Bando et al. | |
| 2013/0286692 A1* | 10/2013 | Patel | H02M 1/126 |
| | | | 702/58 |
| 2014/0321176 A1 | 10/2014 | Seagren et al. | |
| 2015/0349387 A1 | 12/2015 | Inaba et al. | |
| 2016/0156291 A1 | 6/2016 | Becker | |
| 2017/0047869 A1 | 2/2017 | Edwards et al. | |
| 2019/0204467 A1 | 7/2019 | Curt et al. | |
| 2019/0242947 A1* | 8/2019 | Smiley | G01R 31/343 |
| 2020/0403537 A1* | 12/2020 | Jefferies | H02P 29/024 |

OTHER PUBLICATIONS

New Unbalance Factor for Estimating Performance of a Three-Phase Induction Motor With Under- and Overvoltage Unbalance; IEEE Transactions on Energy Conversion, vol. 25, No. 3, pp. 619-625, Sep. 2010.

* cited by examiner

US 11,646,681 B2

MOTOR BRANCH CIRCUIT HEALTH MONITORING METHOD

PRIORITY

The present U.S. patent application is a continuation of U.S. patent application Ser. No. 16/446,050, filed Jun. 19, 2019, and claims priority under 35 U.S.C. § 120. The disclosure of the above priority application is incorporated herein, in its entirety, by reference.

BACKGROUND

Technical Field

The present disclosure relates to motor protection and, more specifically, to techniques for dynamically setting and applying a current imbalance threshold for motor protection, based on measures of voltage imbalance.

Description of the Related Art

Three-phase induction motors have three windings in the stator, which when connected to power lines supplying alternating voltage and current in three-phases, cause magnetic flux to rotate in a positive sequence direction within the stator. The rotor within the stator has an arrangement of closed-loop coils that can rotate and have current induced in them by the rotating magnetic field of the stator windings, forcing the rotor to rotate in the same direction as the positive sequence direction of the magnetic flux within the stator.

As long as the power supply voltages and currents are equal in magnitude in the three-phases, i.e. balanced, the magnetic flux rotates in the positive sequence direction within the stator. However, voltages and currents may occasionally become unbalanced in the three-phases of the power supply lines. For example, such imbalances can result from faults in a distribution transformer or unbalanced distribution of single phase loads on the same branch circuit, such as a momentary current draw by starting-up large electrical machinery or by a heavy arc welder. While three-phase motors may continue to operate with unbalanced voltages and currents, such continued operation can result in less efficient operation and can potentially damage the motor.

SUMMARY

In accordance with one embodiment described herein, a method, apparatus and computer program product monitor the health of a three-phase induction motor or other type of three-phase load. An expected threshold current unbalance is calculated as a function of an expected ratio of current unbalance to voltage unbalance for the three-phase motor or other type of three-phase load. Diagnostic information is generated based on measured current unbalance and measured voltage unbalance. A determination is made as to whether a measured current unbalance exceeds the expected threshold current unbalance. Protection is activated for the three-phase induction motor or other type of three-phase load, based on whether the measured current unbalance exceeds the expected threshold value.

A method to monitor the health of a three-phase load, comprises:
calculating, by a three-phase protective device, an expected current unbalance, as a product of a measured voltage unbalance times an expected ratio of current unbalance to voltage unbalance for a three-phase load;
calculating, by the three-phase protective device, an expected threshold current unbalance indicating a potential fault caused by unbalanced currents, as the expected current unbalance plus a value of unbalance tolerance/sensitivity;
determining, by the three-phase protective device, whether a measured current unbalance exceeds at least one of the expected current unbalance or the expected threshold current unbalance; and
providing, by the three-phase protective device, an action for the three-phase load, based on the determination.

A method to monitor the health of a three-phase induction motor as a three-phase load, comprises:
calculating, by a three-phase protective device, an expected current unbalance for a three-phase induction motor, as a product of a measured voltage unbalance times an expected ratio of current unbalance to voltage unbalance for a three-phase induction motor;
calculating, by the three-phase protective device, a expected threshold current unbalance indicating a potential fault caused by unbalanced currents, as a calculated expected current unbalance of the three-phase induction motor plus a value of unbalance tolerance/sensitivity for the three-phase induction motor;
determining, by the three-phase protective device, that a measured current unbalance exceeds at least one of the expected current unbalance or the expected threshold current unbalance; and
providing, by the three-phase protective device, at least one of diagnostic information or protection for the three-phase induction motor, based on the determination.

DESCRIPTION OF THE FIGURES

Example embodiments are depicted in the accompanying drawings that are briefly described as follows.

DETAILED DESCRIPTION

Voltages and currents within three-phase induction motors may occasionally become unbalanced in the three-phases of the power supply lines, e.g., as a result of faults in a distribution transformer or unbalanced distribution of single phase loads on the same branch circuit, such as a momentary current draw by starting-up large electrical machinery or by a heavy arc welder. A three-phase motor may continue to operate with unbalanced voltages and currents, however its efficiency is reduced by both increased current and increased resistance due to heating. The stator winding with the highest current will have the greatest overheating, resulting in deterioration of the insulation of the stator winding. During power supply unbalance, currents flow through the stator windings in a negative sequence direction, resulting in induction of negative sequence voltage in the rotor coils, abnormal current flow, and overheating.

Under conditions of balanced voltages and currents, where the motor operates at a continuous load for a sufficient time, its operating temperature reaches thermal equilibrium. Each motor has a characteristic safe maximum operating temperature permitted by the motor design, above which permanent damage may begin to occur to insulating layers and other components. Under conditions of current phase unbalance, the stator windings generate heat at an increased rate causing a faster rise in the temperature of the surrounding core. The time interval necessary to raise the temperature of the core to the maximum operating temperature is the trip time after the detection of the unbalance condition. To avoid permanent damage to the motor, conventional protection relays set a fixed threshold for detected current phase unbalance at which the relay is prematurely tripped at an interval that is shorter than the trip time. However, such a fixed threshold is typically optimal under certain conditions, and at other times may result in either under-protection (e.g., when the threshold is set too high) or nuisance trips (e.g., where the threshold is set too low, resulting in false positives).

As such, one embodiment described herein provides a method, apparatus and computer program product for monitoring the health of a three-phase induction motor. The method and apparatus calculate an expected threshold value as a function of an expected ratio of current unbalance to voltage unbalance for the three-phase motor. The method and apparatus determine whether a measured current unbalance exceeds the expected threshold value. The method and apparatus generate diagnostic information or activate protection of the three-phase induction motor, if the measured current unbalance exceeds the expected threshold value.

Figure 1:
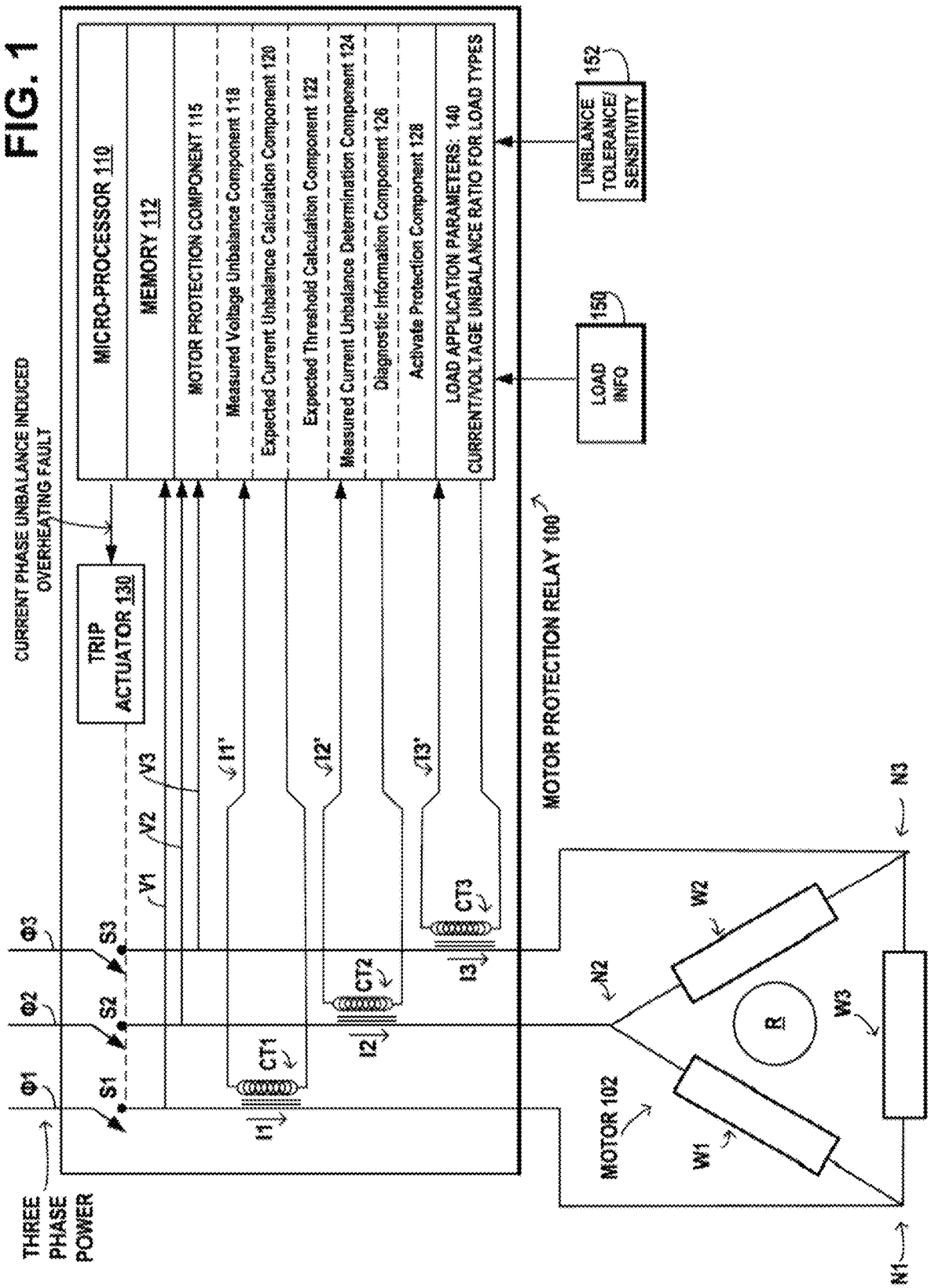
FIG. 1 is an example functional block diagram of the motor protection relay for monitoring the health of a three-phase motor, in accordance with one embodiment described herein.

FIG. 1 is an example functional block diagram of the motor protection relay 100, in accordance with one embodiment described herein. The relay 100 receives three-phase power Φ1, Φ2, and Φ3 and conducts three-phase currents I1, I2, and I3, through optional switches S1, S2, and S3 to the power input nodes N1, N2, and N3 of the three-phase induction motor 102 in a branch circuit. The stator windings W1, W2, and W3 are respectively connected between the power input nodes N1, N2, and N3. The rotor within the stator is driven into rotation when the optional switches S1, S2, and S3 are closed, delivering three-phase currents I1, I2, and I3, to the stator windings W1, W2, and W3. The optional switches S1, S2, and S3 may be located inside the housing of the relay or they may be located outside of it. The trip actuator 130 controls the on/off state of the optional switches S1, S2, and S3. The current transformers CT1, CT2, and CT3 associated with the protection relay 100, are inductively coupled to the currents I1, I2, and I3, and output a sensing current I1', I2', and I3' that are measured by a microprocessor 110 and memory 112 in the protection relay, using known conventional techniques. The current transformers CT1, CT2, and CT3 may be located inside the housing of the relay or they may be located outside of it. Three voltage taps V1, V2, and V3 respectively connect the voltages of the three phases to the microprocessor 110 and memory 112 in the protection relay.

Figure 2:
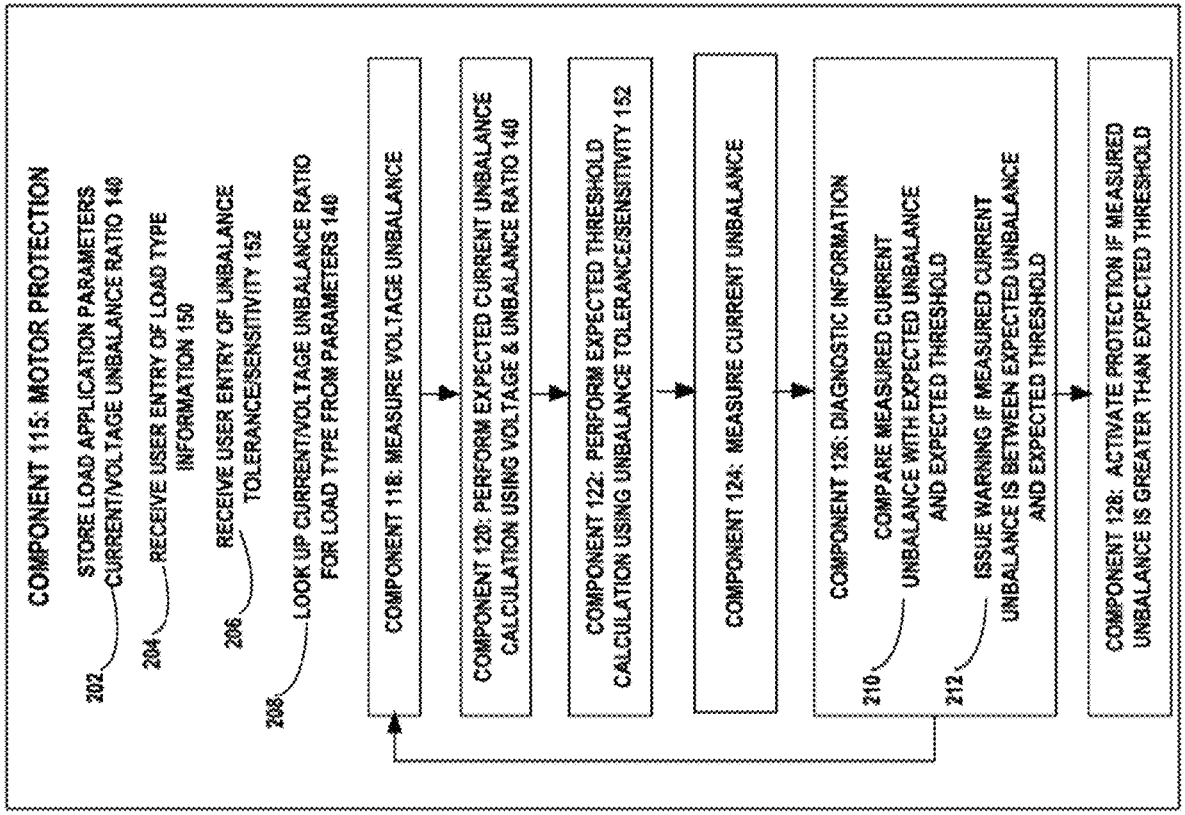
FIG. 2 is an example flow diagram of an example overall method, including a threshold calculation process monitoring the health of the three-phase motor, implemented as computer program code executable by a processor in the motor protection relay.

The memory 112 stores a motor protection component 115, shown in greater detail in FIG. 2. The motor protection component 115 includes the following sub-components: Measured Voltage Unbalance Component 118, Expected Current Unbalance Calculation Component 120, Expected Threshold Calculation Component 122, Measured Current Unbalance Determination Component 124, Diagnostic Information Component 126, and Activate Protection Component 128. The memory 112 also stores load application parameters and in particular, expected ratio of current unbalance to voltage unbalance values 140 for various load types. Example values 140 of the expected ratio of current unbalance to voltage unbalance for an example type of three-phase induction motor 102 may be 6:1, for an example resistor may be 1:1, or for an example drive may be 20:1. The memory 112 receives user entry of load type information 150, such as motor, resistor, or drive. The memory 112 receives user entry values of unbalance tolerance/sensitivity 152 for the three-phase motor 102, such as low 5%, medium 10%, or high 15%.

Example values for the expected ratio of current unbalance to voltage unbalance 140 for three phase induction motors may be provided by the manufacturer or may be determined based on testing by the user. A table with different values for the expected ratio 140 may be based, for example, on the class of the motor, the motor design, its efficiency classification (1E1, 1E2, 1E3, or 1E4).

Example user entry of load type information 150 for three-phase single-speed, cage-induction motors may include a specification for having 2, 4, or 6 poles (3,000; 1,500; and 1,000 RPM at 50 Hz), having a rated output between 0.75 and 375 kW, having a rated voltage up to 1000 V, and a rating on the basis of either duty type S1 (continuous duty) or S3 (intermittent duty) with a rated cyclic duration factor.

Example user entry of the unbalance tolerance/sensitivity 152 for a three phase induction motor is primarily related to the priority in the user's application. A large tolerance in load sensitivity 152 would correspond to the user's preference to prioritize continued operation during a non-critical problem that is manifested by unexpected unbalance. A small tolerance in load sensitivity 152 would correspond to the user's preference to prioritize immediately stopping to diagnose a problem that is manifested by unexpected unbalance.

In an example embodiment, the motor manufacturer may include with the motor, a memory chip that stores the motor's parameters for values 140 of the expected ratio of current unbalance to voltage unbalance for each type of three-phase motor 102. The motor's parameters are accessible by the micro-processor 110 in the motor protection relay 100.

In another embodiment, the three-phase power Φ1, Φ2, and Φ3 may supply a three-phase alternating current I1, I2, and I3 to a three-phase heater with heater coils W1, W2, and W3, functioning as another type of three-phase load, being respectively connected between the power input nodes N1, N2, and N3 and neutral, in the star or wye configuration shown in FIG. 1. The three-phase heater generates resistive heat when the switches S1, S2, and S3 are closed, delivering three-phase currents I1, I2, and I3 to the heater coils W1, W2, and W3. An example value 140 of the expected ratio of current unbalance to voltage unbalance for an example three-phase heater may be a ratio of 1 to 1. Example user entry of the load type information 150 may be as a resistor. Example user entry of the unbalance tolerance/sensitivity 152 for an example three-phase heater is primarily related to the priority in the user's application. A large tolerance in load sensitivity 152 would correspond to the user's preference to prioritize continued operation of the three-phase heater during a non-critical problem that is manifested by unexpected unbalance. A small tolerance in load sensitivity 152 would correspond to the user's preference to prioritize immediately turning off the heater to diagnose a problem that is manifested by unexpected unbalance. The principle of operation of the motor protection component 115 is also applicable to monitoring the health an example three-phase heater. The measured current unbalance of an example three-phase heater may be analyzed to determine whether it exceeds a calculated expected threshold current unbalance as a function of the expected ratio of current unbalance to voltage unbalance for the three-phase heater. Diagnostic information or activation of protection may be performed for the three-phase heater, if the measured current unbalance exceeds the expected threshold value.

FIG. 2 is an example flow diagram of an example overall method, including a threshold calculation process monitoring the health of the three-phase motor 102, implemented as computer program code executable by the processor 110 in the motor protection relay 100.

The Motor Protection Component

The motor protection component 115 stores at 202 the load application parameters for the expected ratio of current unbalance to voltage unbalance 140. The motor protection component 115 receives at 204 the user entry of load type information 150, for example the particular type of induction motor 102. The motor protection component 115 receives at 206 the user entry of unbalance tolerance/sensitivity 152. The user sets the unbalance tolerance/sensitivity based on how the user intends to operate the motor, either very conservatively to minimize wear, or aggressively to extract maximum performance at the possible sacrifice of useable life of the motor. The motor protection component 115 performs a look up to obtain the value of the expected ratio of current unbalance to voltage unbalance 140 for the particular type of motor 102.

The Measured Voltage Unbalance Component

The Measured Voltage Unbalance Component 118, which is a sub-component of the motor protection component 115 of FIG. 2, measures the line-to-line voltages V1, V2, and V3 applied to the nodes N1, N2, and N3 of the three-phase motor 102 and determines a percent unbalance 400 in the measured voltages. A general definition for measuring the line-to-line voltage unbalance is provided in "Definitions of Voltage Unbalance", *IEEE Power Engineering Review*, Volume: 21, Issue: 5, May 2001. The Line Voltage Unbalance Rate is the ratio of the maximum voltage deviation of any of the voltages V1, V2, and V3 from the average phase voltage magnitude, divided by the average phase voltage magnitude Vavg. Using this definition, the calculation of percent unbalance 400 in the measured voltages may be:

percent unbalance measured voltages=100*{max [(V1−Vavg),(V2−Vavg),(V3−Vavg)]}/Vavg.

Other definitions of voltage unbalance may be used to calculate the percent unbalance 400 in the measured voltages V1, V2, and V3 (see Anwari, et al., "New Unbalance Factor for Estimating Performance of a Three-Phase Induction Motor With Under- and Overvoltage Unbalance", *IEEE Transactions on Energy Conversion*, 25(3), pp. 619-625, October 2010).

The Measured Voltage Unbalance Component 118 may also detect variations in the power quality when a measured phase voltage V1, V2, or V3 deviates from the prescribed range, such as resulting from a momentary unbalanced distribution of single phase loads on the same branch circuit. Since such momentary deviations in power quality may occur randomly and frequently, the Measured Voltage Unbalance Component 118 may be repeatedly invoked in a loop to detect power quality variations to be factored into the diagnosis performed by the Diagnostic Information Component 126.

The Expected Current Unbalance Calculation Component

Figure 4:
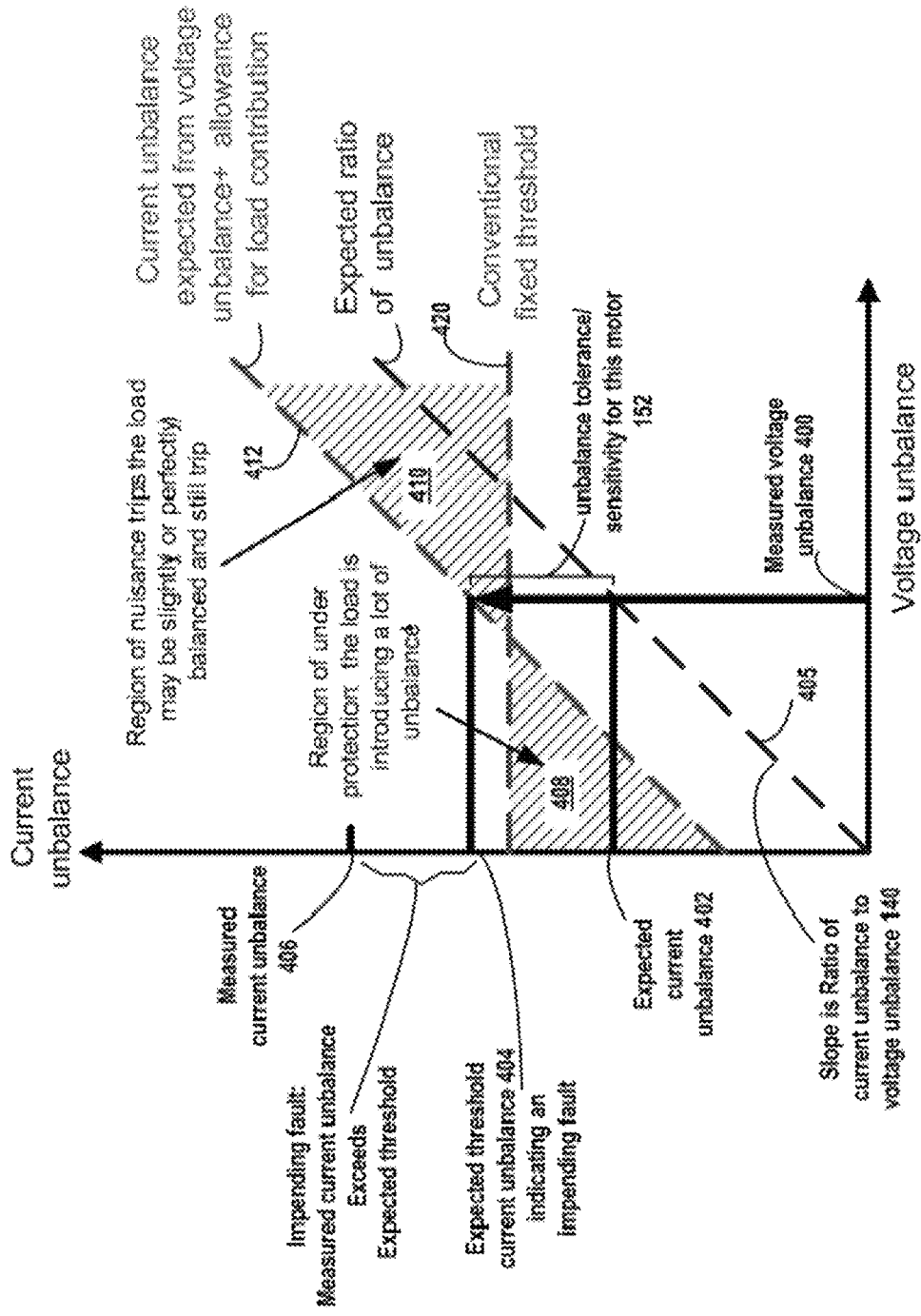
FIG. 4 is an example graph illustrating an example diagnostic and protection function of the motor protection relay of FIG. 1 and the method of FIG. 2.

The Expected Current Unbalance Calculation Component 120, which is a sub-component of the motor protection component 115 of FIG. 2, performs the expected current unbalance calculation by using the percent unbalance in the measured voltages and the value of the expected ratio of current unbalance to voltage unbalance 140 for the particular type of motor 102. The calculation of the Expected Current Unbalance is the percent unbalance in the measured voltages times the expected ratio of current unbalance to voltage unbalance 140. Reference to FIG. 4 shows a graph of voltage unbalance (abscissa) to current unbalance (ordinate) for the particular type of motor 102. The figure shows the straight line trace 405 of the expected current unbalance 402 as a function of the voltage unbalance (abscissa) and the slope of the straight line trace is the particular expected ratio of current unbalance to voltage unbalance 140. FIG. 4 shows that the Expected Current Unbalance 402 on the ordinate corresponds to the percent unbalance in the measured voltages 400 on the abscissa.

The Expected Threshold Calculation Component

The Expected Threshold Calculation Component 122, which is a sub-component of the motor protection component 115 of FIG. 2, performs the calculation of the Expected Threshold current unbalance using unbalance tolerance/sensitivity 152. The calculation of the Expected Threshold current unbalance is the Expected Current Unbalance 402 plus the unbalance tolerance/sensitivity 152. FIG. 4 shows the straight line trace 412 of the Expected Threshold current unbalance as a function of the voltage unbalance (abscissa) for the user-selected value of unbalance tolerance/sensitivity type 152. FIG. 4 shows that the Expected Threshold current unbalance 404 on the ordinate corresponds to the percent unbalance in the measured voltages 400 on the abscissa.

The Measure Current Unbalance Component

The Measure Current Unbalance Component 124, which is a sub-component of the motor protection component 115 of FIG. 2, measures currents I1, I2, and I3 flowing in the corresponding stator windings W1, W2, and W3 of the three-phase motor 102 and determines a percent unbalance 406 in the measured currents. The computation of the percent unbalance 406 in the measured currents may be approximated by adapting the formula for computation of the measured voltage unbalance 400 described above for the Measured Voltage Unbalance Component 118:

percent unbalance in measured currents=100*{max [(I1−Iavg),(I2−Iavg),(I3−Iavg)]}/Iavg.

Other definitions of current unbalance may be used to calculate the percent unbalance 406 in the measured currents I1, I2, and I3. FIG. 4 shows the percent unbalance 406 in the measured currents on the ordinate of the graph.

The Diagnostic Information Component

Figure 3:
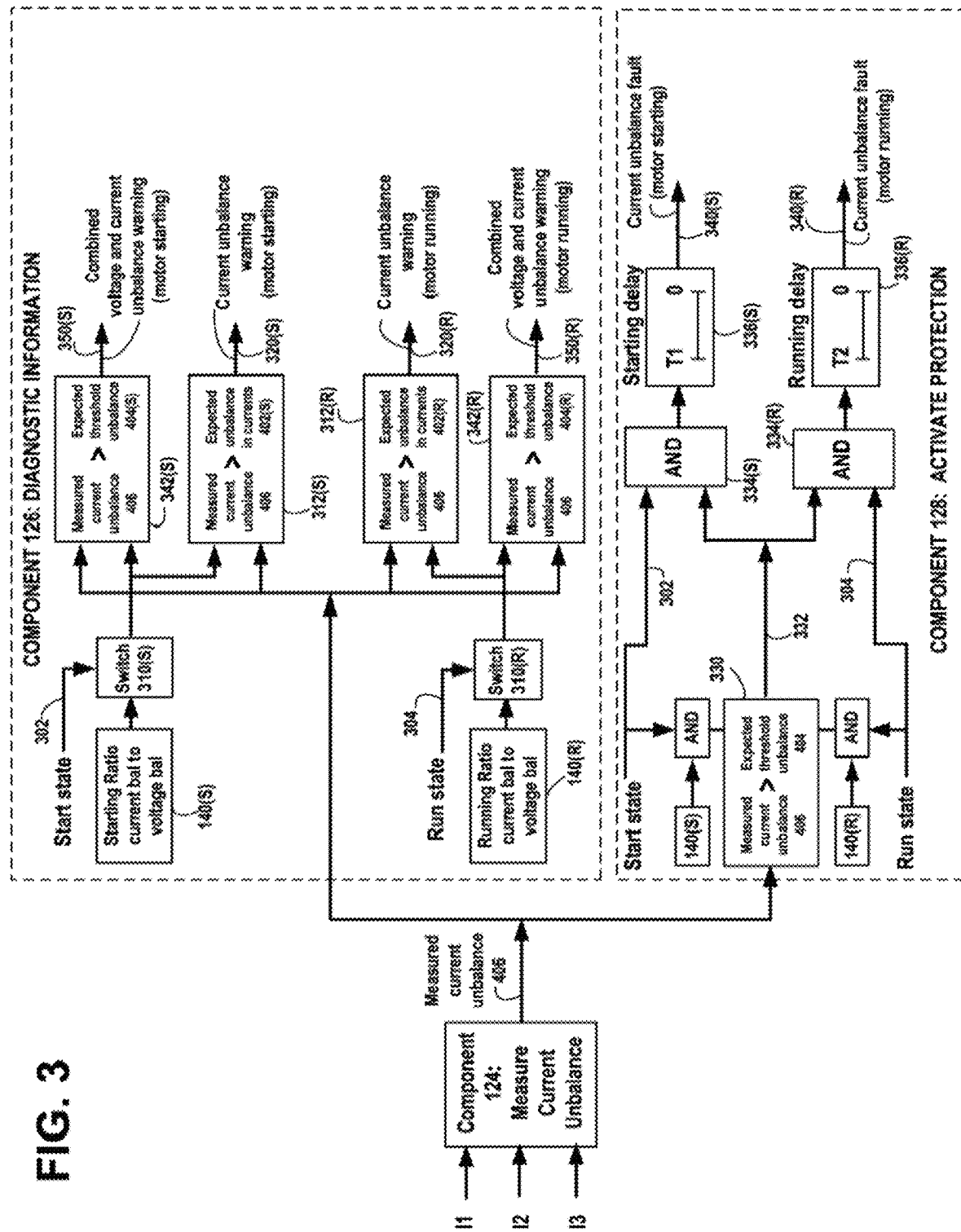
FIG. 3 is an example logic block diagram for generating a warning signal or a fault signal in response to a detected current phase unbalance at which the motor protection relay will be tripped, implemented as computer program code executable by a processor in the motor protection relay.

The Diagnostic Information Component 126, which is a sub-component of the motor protection component 115 of FIG. 2, compares at 210 the measured current unbalance 406 with the expected current unbalance 402 and the expected threshold current unbalance 404. The Diagnostic Information Component 126 monitors the health of a three-phase induction motor and may issue a warning at 212 if the measured current unbalance 406 exceeds the expected current unbalance 402, as is illustrated in the logic block diagram FIG. 3. A warning may be issued if the measured current unbalance 406 is greater than, for example, a predetermined fraction of the expected threshold current unbalance 404, as is illustrated in FIG. 3. The Diagnostic Information Component 126 may repeatedly loop back to the Measured Voltage Unbalance Component 118, as shown in FIG. 2, to detect power quality variations to be factored into the diagnosis.

The logic block diagram FIG. 3 shows that the Diagnostic Information Component 126 may use different values for the expected ratio of current unbalance to voltage unbalance, depending on whether the motor 102 is in a start state or a run state. The expected ratio 140 may generally have a starting ratio 140(S) when starting and it may generally have a running ratio 140(R) when running at its designed speed, between unloaded and fully loaded. In some embodiments the difference between the lower ratio 140(S) when starting and the higher ratio 140(R) when running, may be considered small enough to approximate the two ratios as being substantially equal. In some embodiments, the starting ratio 140(S) and/or the running ratio 140(R) may have other values, such as a relationship between the measured current and the nominal (name plate) current.

The logic block diagram FIG. 3 shows the Diagnostic Information Component 126 receiving the measured current unbalance 406 from the Measure Current Unbalance Component 124. For example, the measured current unbalance 406 may be input to logic blocks 342(S) and 312(S) for the motor start state, and to logic blocks 342(R) and 312(R) for the motor run state. For example, the start state signal value 302 closes the switch 310(S) and the value of the starting ratio of current unbalance to voltage unbalance 140(S) is applied to logic blocks 342(S) and 312(S) for the motor start state. The logic block 312(S) determines whether the measured current unbalance 406 exceeds the expected current unbalance 402(S), using the lower expected ratio 140(S). If the measured current unbalance 406 exceeds the expected current unbalance 402(S), then logic block 312(S) outputs a current unbalance warning 320(S) for the motor start state, which may be displayed to operating personnel. The logic block 342(S) determines whether the measured current unbalance 406 is greater than the expected threshold current unbalance 404(S), using the lower expected ratio 140(S). If the measured current unbalance 406 is greater, then logic block 342(S) outputs a combined voltage and current unbalance warning 350(S) for the motor start state, which may be displayed to operating personnel.

For example, the run state signal value 304 closes the switch 310(R) and the value of the running ratio of current unbalance to voltage unbalance 140(R) is applied to logic blocks 342(R) and 312(R) for the motor run state. The logic block 312(R) determines whether the measured current unbalance 406 exceeds the expected current unbalance 402 (R), using the higher expected ratio 140(R). If the measured current unbalance 406 exceeds the expected current unbalance 402(R), then logic block 312(R) outputs a current unbalance warning 320(R) for the motor run state, which may be displayed to operating personnel. The logic block 342(R) determines whether the measured current unbalance 406 is greater than the expected threshold current unbalance 404(R), using the higher expected ratio 140(R). If the measured current unbalance 406 is greater, then logic block 342(R) outputs a combined voltage and current unbalance warning 350(R) for the motor run state, which may be displayed to operating personnel.

After the Diagnostic Information Component 126 has performed a diagnosis of the health of a three-phase induction motor by measuring current unbalance and measuring voltage unbalance, it may repeatedly loop back to the Measured Voltage Unbalance Component 118, as shown in FIG. 2, to detect any variations in the power quality when a measured phase voltage V1, V2, or V3 deviates from the prescribed range, such as resulting from a momentary unbalanced distribution of single phase loads on the same branch circuit.

The Activate Protection Component

The Activate Protection Component 128, which is a sub-component of the motor protection component 115 of FIG. 2, activates protection if the measured current unbalance 406 is greater than the expected threshold current unbalance 404, such as by causing the microprocessor 110 to trip the actuator 130. The Activate Protection Component 128 may delay activating protection pending the expiration of a time out interval, after which the activation of protection may commence, as is illustrated in FIG. 3. The duration of the time out interval may be shorter for a start state operation for the motor due to higher currents, and a longer time out interval when the motor is running under load.

The logic block diagram FIG. 3 shows that the Activate Protection Component 128 may use different values for the expected ratio of current unbalance to voltage unbalance, depending on whether the motor 102 is in a start state or a run state. The expected ratio 140 will have a lower ratio 140(S) when starting and it will have a higher ratio 140(R) when running at its designed speed, between unloaded and fully loaded.

The logic block diagram FIG. 3 shows the Activate Protection Component 128 receiving the measured current unbalance 406 from the Measure Current Unbalance Component 124. For example, the measured current unbalance 406 may be input to logic block 330. The logic block 330 determines whether the measured current unbalance 406 exceeds the expected threshold current unbalance 404. The start state signal value 302 and the value of the lower expected ratio 140(S) are input to an AND logic block, and if both values are true, the expected threshold current unbalance 404 uses the lower expected ratio 140(S). If logic block 330 determines that the measured current unbalance 406 exceeds the expected threshold current unbalance 404, using the lower expected ratio 140(S), then an enabling signal 332 is applied to AND logic block 334(S) for the motor start state. The starting delay logic block 336(S) will delay outputting a current unbalance fault signal 340(S) and the activating protection pending the expiration of a short time out interval T1, after which the activation of protection may commence, as is illustrated in FIG. 3. The duration of the time out interval T1 may be shorter for the start state operation for the motor due to higher currents, and a longer time out interval when the motor is running under load.

For example, the run state signal value 304 and the value of the higher expected ratio 140(R) are input to an AND logic block, and if both values are true, the expected threshold current unbalance 404 uses the higher expected ratio 140((R). If logic block 330 determines that the measured current unbalance 406 exceeds the expected threshold current unbalance 404, using the higher expected ratio 140(R), then the enabling signal 332 is applied to AND logic block 334(R) for the motor run state. The running delay logic block 336(R) will delay outputting a current unbalance fault signal 340(R) and the activating protection pending the expiration of a longer time out interval T2, after which the activation of protection may commence, as is illustrated in FIG. 3. The duration of the time out interval T2 may be longer for the run state operation for the motor than for the start state operation.

If the measured current unbalance does not exceed the expected threshold current unbalance 404, then the health of the three-phase induction motor is acceptable.

FIG. 4 is an example graph illustrating an example diagnostic and protection function of the motor protection relay of FIG. 1 and the method of FIG. 2. The figure shows a graph of voltage unbalance (abscissa) to current unbalance (ordinate) for the particular type of motor 102. The figure shows the straight line trace 405 of the expected current unbalance 402 as a function of the voltage unbalance (abscissa) and the slope of the straight line trace is the particular expected ratio of current unbalance to voltage unbalance 140. The Expected Current Unbalance 402 on the ordinate corresponds to the percent unbalance in the measured voltages 400 on the abscissa. The figure shows the straight line trace 412 of the Expected Threshold current unbalance as a function of the voltage unbalance (abscissa) for the user-selected value of unbalance tolerance/sensitivity type 152. The line 412 represents the current unbalance expected from voltage unbalance plus an allowance for the load contribution load sensitivity. The figure shows that the Expected Threshold current unbalance 404 on the ordinate corresponds to the percent unbalance in the measured voltages 400 on the abscissa. The line 420 represents a conventional fixed threshold. The region 408 represents an area of insufficient protection wherein the load is significantly contributing to the unbalance. The region 410 is an area of nuisance trips, wherein the load may be slightly (or perfectly) balanced and still cause a trip.

The resulting method, apparatus and computer program product monitor the health of a three-phase induction motor or other type of three-phase load. An expected threshold current unbalance is calculated as a function of an expected ratio of current unbalance to voltage unbalance for the three-phase motor or other type of three-phase load. Diagnostic information is generated based on measured current unbalance and measured voltage unbalance. A determination is made as to whether a measured current unbalance exceeds the expected threshold current unbalance. Protection is activated for the three-phase induction motor or other type of three-phase load, based on whether the measured current unbalance exceeds the expected threshold value.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method, comprising:
calculating, by a three-phase protective device:
a first expected current unbalance, as a product of a measured voltage unbalance times an expected ratio of current unbalance to voltage unbalance for a three-phase load;
a second expected current unbalance for a three-phase induction motor, as the product of the measured voltage unbalance times an expected ratio of current unbalance to voltage unbalance for the three-phase induction motor; and
an expected threshold current unbalance indicating a potential fault caused by unbalanced currents, as the expected current unbalance plus a value of unbalance tolerance/sensitivity;
determining, by the three-phase protective device, that a sum of the measured current unbalance and a product of the measured voltage unbalance times the second expected ratio of current unbalance to voltage unbalance for the three-phase induction motor, exceeds a predetermined fraction of the expected threshold current unbalance;
providing, by the three-phase protective device, diagnostic information warning of a potential fault condition for the three-phase induction motor; and
upon determining, by the three-phase protective device, that a measured current unbalance exceeds at least one of (i) the first expected current unbalance, (ii) the second expected current unbalance and (iii) the expected threshold current unbalance, performing, by the three-phase protective device, a protection operation relating to a motor protection relay for the three-phase load.

2. The method of claim 1, further comprising:
determining, by the three-phase protective device, that the measured current unbalance exceeds the expected current unbalance; and
providing, by the three-phase protective device, diagnostic information for the three-phase load, based on the determination.

3. The method of claim 1, further comprising:
determining, by the three-phase protective device, that the measured current unbalance exceeds the expected threshold current unbalance; and
providing, by the three-phase protective device, protection for the three-phase load, based on the determination.

4. The method of claim 1, further comprising:
calculating, by the three-phase protective device, the expected current unbalance for a three-phase induction motor, as the product of the measured voltage unbalance times an expected ratio of current unbalance to voltage unbalance for the three-phase induction motor;
determining, by the three-phase protective device, that the measured current unbalance exceeds the expected current unbalance; and
providing, by the three-phase protective device, diagnostic information warning of a potential fault condition for the three-phase induction motor.

5. The method of claim 1, further comprising:
calculating, by the three-phase protective device, the expected current unbalance for a three-phase induction motor, as the product of the measured voltage unbalance times an expected ratio of current unbalance to voltage unbalance for the three-phase induction motor;
calculating, by the three-phase protective device, the expected threshold current unbalance indicating a potential fault caused by unbalanced currents, as the calculated expected current unbalance of the three-phase induction motor plus a value of unbalance tolerance/sensitivity for the three-phase induction motor;
determining, by the three-phase protective device, that the measured current unbalance exceeds the expected threshold current unbalance; and
providing, by the three-phase protective device, protection for the three-phase load, based on the determination.

6. The method of claim 1, further comprising:
calculating, by the three-phase protective device, the expected current unbalance for a three-phase induction motor, as the product of the measured voltage unbalance times an expected ratio of current unbalance to voltage unbalance for the three-phase induction motor, the expected ratio based on whether the three-phase induction motor is in a start state or a run state;
calculating, by the three-phase protective device, the expected threshold current unbalance indicating a potential fault caused by unbalanced currents, as the calculated expected current unbalance of the three-phase induction motor plus a value of unbalance tolerance/sensitivity for the three-phase induction motor;
determining, by the three-phase protective device, that that the measured current unbalance exceeds the expected threshold current unbalance; and
delaying, by the three-phase protective device, providing protection for the three-phase induction motor, for a duration based on whether the three-phase induction motor is in the start state or the run state.

7. An apparatus, comprising:
at least one processor;
memory including computer program code that, when executed by operation of the at least one processor, performs an operation comprising:
calculating, by a three-phase protective device:
a first expected current unbalance, as a product of a measured voltage unbalance times an expected ratio of current unbalance to voltage unbalance for a three-phase load;
a second expected current unbalance for a three-phase induction motor, as the product of the measured voltage unbalance times an expected ratio of current unbalance to voltage unbalance for the three-phase induction motor; and
an expected threshold current unbalance indicating a potential fault caused by unbalanced currents, as the expected current unbalance plus a value of unbalance tolerance/sensitivity;
determining, by the three-phase protective device, that a sum of the measured current unbalance and a product of the measured voltage unbalance times the second expected ratio of current unbalance to voltage unbalance for the three-phase induction motor, exceeds a predetermined fraction of the expected threshold current unbalance;

providing, by the three-phase protective device, diagnostic information warning of a potential fault condition for the three-phase induction motor; and upon determining, by the three-phase protective device, that a measured current unbalance exceeds at least one of (i) the first expected current unbalance, (ii) the second expected current unbalance and (iii) the expected threshold current unbalance, performing, by the three-phase protective device, a protection operation relating to a motor protection relay for the three-phase load.

8. The apparatus of claim 7, the operation further comprising:

determining, by the three-phase protective device, that the measured current unbalance exceeds the expected current unbalance; and providing, by the three-phase protective device, diagnostic information for the three-phase load, based on the determination.

9. The apparatus of claim 7, further comprising:

determining, by the three-phase protective device, that the measured current unbalance exceeds the expected threshold current unbalance; and providing, by the three-phase protective device, protection for the three-phase load, based on the determination.

10. The apparatus of claim 7, further comprising:

calculating, by the three-phase protective device, the expected current unbalance for a three-phase induction motor, as the product of the measured voltage unbalance times an expected ratio of current unbalance to voltage unbalance for the three-phase induction motor;

determining, by the three-phase protective device, that the measured current unbalance exceeds the expected current unbalance; and providing, by the three-phase protective device, diagnostic information warning of a potential fault condition for the three-phase induction motor.

11. The apparatus of claim 7, the operation further comprising:

calculating, by the three-phase protective device, the expected current unbalance for a three-phase induction motor, as the product of the measured voltage unbalance times an expected ratio of current unbalance to voltage unbalance for the three-phase induction motor;

calculating, by the three-phase protective device, the expected threshold current unbalance indicating a potential fault caused by unbalanced currents, as the calculated expected current unbalance of the three-phase induction motor plus a value of unbalance tolerance/sensitivity for the three-phase induction motor;

determining, by the three-phase protective device, that the measured current unbalance exceeds the expected threshold current unbalance; and providing, by the three-phase protective device, protection for the three-phase load, based on the determination.

12. The apparatus of claim 7, further comprising:

calculating, by the three-phase protective device, the expected current unbalance for a three-phase induction motor, as the product of the measured voltage unbalance times an expected ratio of current unbalance to voltage unbalance for the three-phase induction motor, the expected ratio based on whether the three-phase induction motor is in a start state or a run state;

calculating, by the three-phase protective device, the expected threshold current unbalance indicating a potential fault caused by unbalanced currents, as the calculated expected current unbalance of the three-phase induction motor plus a value of unbalance tolerance/sensitivity for the three-phase induction motor;

determining, by the three-phase protective device, that that the measured current unbalance exceeds the expected threshold current unbalance; and delaying, by the three-phase protective device, providing protection for the three-phase induction motor, for a duration based on whether the three-phase induction motor is in the start state or the run state.

13. A computer program product comprising computer program code recorded on a non-transitory computer-readable, the computer program code when executed by operation of one or more computer processors, performs an operation comprising:

calculating, by a three-phase protective device:

a first expected current unbalance, as a product of a measured voltage unbalance times an expected ratio of current unbalance to voltage unbalance for a three-phase load;

a second expected current unbalance for a three-phase induction motor, as the product of the measured voltage unbalance times an expected ratio of current unbalance to voltage unbalance for the three-phase induction motor;

an expected threshold current unbalance indicating a potential fault caused by unbalanced currents, as the expected current unbalance plus a value of unbalance tolerance/sensitivity;

determining, by the three-phase protective device, that a sum of the measured current unbalance and a product of the measured voltage unbalance times the second expected ratio of current unbalance to voltage unbalance for the three-phase induction motor, exceeds a predetermined fraction of the expected threshold current unbalance;

providing, by the three-phase protective device, diagnostic information warning of a potential fault condition for the three-phase induction motor; and upon determining, by the three-phase protective device, that a measured current unbalance exceeds at least one of (i) the first expected current unbalance, (ii) the second expected current unbalance and (iii) the expected threshold current unbalance, performing, by the three-phase protective device, a protection operation relating to a motor protection relay for the three-phase load.

14. The computer program product of claim 13, the operation further comprising:

determining, by the three-phase protective device, that the measured current unbalance exceeds the expected current unbalance; and providing, by the three-phase protective device, diagnostic information for the three-phase load, based on the determination.

15. The computer program product of claim 13, the operation further comprising:

calculating, by the three-phase protective device, the expected current unbalance for a three-phase induction motor, as the product of the measured voltage unbalance times an expected ratio of current unbalance to voltage unbalance for the three-phase induction motor;

determining, by the three-phase protective device, that the measured current unbalance exceeds the expected current unbalance; and providing, by the three-phase protective device, diagnostic information warning of a potential fault condition for the three-phase induction motor.

16. The computer program product of claim 13, the operation further comprising:

determining, by the three-phase protective device, whether a measured current unbalance exceeds at least one of the expected current unbalance or the expected threshold current unbalance; and providing, by the three-phase protective device, an action for the three-phase load, based on the determination.

17. The computer program product of claim 13, further comprising:

calculating, by the three-phase protective device, the expected current unbalance for a three-phase induction motor, as the product of the measured voltage unbalance times an expected ratio of current unbalance to voltage unbalance for the three-phase induction motor;

calculating, by the three-phase protective device, the expected threshold current unbalance indicating a potential fault caused by unbalanced currents, as the calculated expected current unbalance of the three-phase induction motor plus a value of unbalance tolerance/sensitivity for the three-phase induction motor;

determining, by the three-phase protective device, that that the measured current unbalance exceeds the expected threshold current unbalance; and providing, by the three-phase protective device, protection for the three-phase load, based on the determination.

\* \* \* \* \*